(12) United States Patent
Sugawara et al.

(10) Patent No.: US 6,563,682 B1
(45) Date of Patent: May 13, 2003

(54) MAGNETO RESISTIVE ELEMENT

(75) Inventors: Junichi Sugawara, Miyagi (JP); Eiji Nakashio, Miyagi (JP); Hitoshi Kubota, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/652,317

(22) Filed: Aug. 31, 2000

(51) Int. Cl.$^7$ ................................................ G11B 5/39
(52) U.S. Cl. ..................................................... 360/324.2
(58) Field of Search ........................ 360/324.2, 324.12, 360/324.11, 324.1

(56) References Cited

U.S. PATENT DOCUMENTS 5,966,012 A * 10/1999 Parkin ......................... 324/252
6,023,395 A * 2/2000 Dill et al. ................. 360/324.2
6,185,078 B1 * 2/2001 Lin et al. .................. 360/324.1
6,282,069 B1 * 8/2001 Nakazawa et al. ........ 360/324.2
6,327,123 B1 * 12/2001 Kawato et al. ......... 360/324.11
6,341,053 B1 * 1/2002 Nakada et al. ........... 360/324.2

* cited by examiner

Primary Examiner—David L. Ometz
(74) Attorney, Agent, or Firm—Sonnenschein, Nath & Rosenthal

(57) ABSTRACT

A second magnetic metal layer which is a magnetization free layer is successively covered with a non-magnetic metal layer and an anti-ferromagnetic layer. This enables to make the magnetization free layer a single magnetic domain and prevent generation of a domain wall. This prevents hysteresis and suppresses the Barkhausen noise.

14 Claims, 4 Drawing Sheets

MAGNETO RESISTIVE ELEMENT

BACKGROUND OF THE INVENTION

1. Field of the Invention

The present invention relates to a magneto-resistive element including a magnetization fixed layer in which magnetization is fixed in a direction, a tunnel barrier layer formed on the magnetization fixed layer, and a magnetization free layer formed on the tunnel barrier layer, and a production method thereof.

2. Description of the Related Arts

In a tunnel barrier layer formed from a non-magnetic and insulating material and sandwiched by two magnetic layers, when a current is applied approximately vertically with respect to the magnetic layers, a so-called tunnel current flows from one of the magnetic layers to the other. This phenomenon is known as the ferromagnetic tunnel effect.

This tunnel current has a conductance changing according to a relative angle of the magnetization directions of the two magnetic layers. In the aforementioned ferromagnetic tunnel effect, it is possible to theoretically calculate a reluctivity from the polarizability of magnetization of the two magnetic layers. For example, when the two magnetic layers are made from Fe, the reluctivity is estimated to be about 40%.

For this, a magneto-resistive element (hereinafter, referred to as an MR element) utilizing the aforementioned ferromagnetic tunnel effect, which is called a tunnel junction type MR element (hereinafter, referred to as a TMR element), is expected as a material for a magneto-resistive magnetic head (hereinafter, referred to as an MR head).

The MR head detects a voltage value of a current flowing in the MR element via electrodes and reads a magnetic signal recorded on a magnetic recording medium.

The aforementioned TMR element includes a tunnel barrier layer formed from a non-magnetic and insulating material and sandwiched by a magnetization fixed layer in which magnetization is fixed and a magnetization free layer in which magnetization is not fixed. A change of the magnetization direction of the magnetization free layer by an external magnetic field changes the relative angle defined by the magnetization direction of the magnetization fixed layer and the magnetization direction of the magnetization free layer. This in turn changes the conductance of the tunnel current. When the TMR element is utilized for an MR head, this conductance change is detected so as to read a magnetic signal.

In the MR head, in order to suppress the Barkhausen noise, it is important to perform a magnetic domain control so that the MR element has a single magnetic domain. As in a conventional MR head when an anisotropic magneto-resistive (AMR) element and a giant magneto-resistive (GMR) element are used as magnetism detection elements, at the both ends of the MR element, there are arranged a bias layer formed from a hard magnetic material for applying a bias magnetic field to the MR element. Thus, the MR element has a single magnetic domain.

However, when an MR head is produced using a TMR element, an electrode is arranged on both main surfaces of the TMR element and an electric current is applied approximately vertically with respect to the film surface, so as to determine a conductance of the tunnel current flowing through an insulation layer for reading a magnetic signal. Accordingly, when a bias layer is arranged at the both ends of the TMR element, it becomes impossible to maintain insulation between the magnetization free layer and the magnetization fixed layer, short-circuiting the TMR element, disabling to read a magnetic signal.

For this, in an MR head using the TMR element as a magnetism detecting element, it becomes impossible to perform a magnetic domain control by providing a bias layer at both ends of the TMR element.

The aforementioned magnetization fixed layer has a ferromagnetic layer and an anti-ferromagnetic layer. The anti-ferromagnetic layer is in exchange coupling with the ferromagnetic layer. Accordingly, in the magnetization fixed layer, magnetization is controlled. However, in the magnetization free layer, magnetization is not controlled.

SUMMARY OF THE INVENTION

It is therefore an object of the present invention to provide a magneto-resistive element capable of suppressing the Barkhausen noise to obtain a stable reproduction even when utilizing the ferromagnetic tunnel effect and a production method thereof.

In order to achieve the aforementioned object, the magneto-resistive element according to the present invention includes: a magnetization fixed layer whose magnetization is fixed in a predetermined direction, a tunnel barrier layer formed on the magnetization fixed layer, and a magnetization free layer formed on the tunnel barrier layer and whose magnetization direction freely changes. Moreover, a non-magnetic metal layer is present on the magnetization free layer and a conductive anti-ferromagnetic layer is formed on the non-magnetic metal layer.

In the magneto-resistive element having the aforementioned configuration, the magnetization free layer and the conductive anti-ferromagnetic layer are in exchange coupling via the non-magnetic metal layer. Accordingly, it is possible to control a magnetic domain without fixing the magnetization direction of the magnetization free layer.

Moreover, the magneto-resistive element production method includes a layering step for layering on a substrate, a lower shield layer, a lower gap layer, a magnetization fixed layer, a tunnel barrier layer, a non-magnetic metal layer, and a conductive anti-ferromagnetic film.

According to the magneto-resistive element production method of the present invention, it is possible to provide a magneto-resistive element in which magnetic domain control can be performed without fixing the magnetization direction in the magnetization free layer.

DESCRIPTION OF PREFERRED EMBODIMENTS

Description will now be directed to embodiments of the present invention with reference to the attached drawings.

Figure 1:
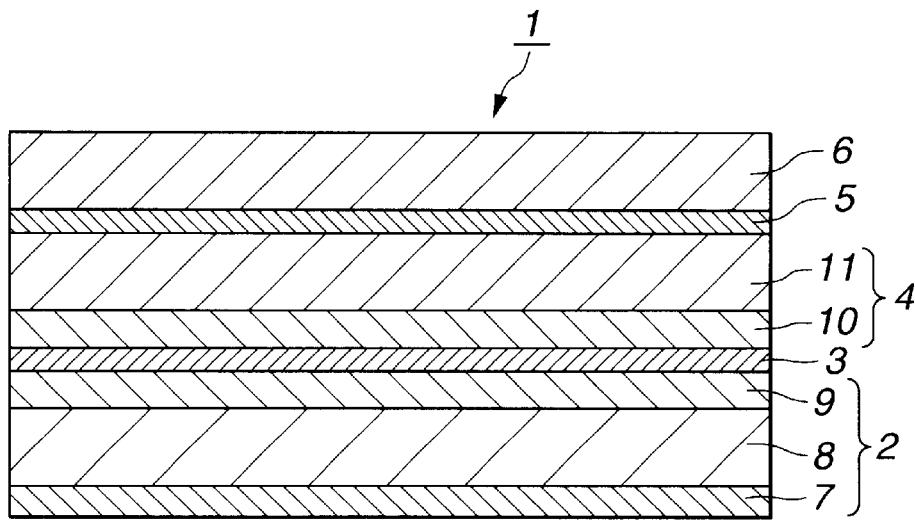
FIG. 1 is an enlarged cross sectional view of an essential portion of an MR element according to the present invention.

Firstly, explanation will be given on a tunnel junction type magneto-resistive element (hereinafter, referred to as a TMR element) 1 as shown in FIG. 1 as the magneto-resistive element according to the present invention. This TMR element 1 is magneto-resistive element (hereinafter, referred to as an MR element) utilizing the ferromagnetic tunnel effect. It should be noted that in the drawings used for explanation below, particular portions may be enlarged so as to clearly show some features and the dimensional ratio between members are not identical to the actual ratio.

The TMR element 1 includes a first magnetic metal layer 2, a tunnel barrier layer 3, a second magnetic metal layer 4, a non-magnetic metal layer 5, and a conductive anti-ferromagnetic layer 6 which are successively formed.

The first magnetic metal layer 2 is a magnetization fixed layer, i.e., its magnetization direction is fixed. The first magnetic metal layer 2 has an undercoat layer 7, an anti-ferromagnetic layer 8, and a pin layer 9 which are successively formed. The pin layer 9 is formed at the side of the tunnel barrier layer 3.

The undercoat layer 7 is, for example, formed from NiFe. The anti-ferromagnetic layer 8 is in exchange coupling with the pin layer, so as to fix the magnetization direction of the pin layer 9. The anti-ferromagnetic layer 8 is made from an anti-ferromagnetic material such as IrMn. The pin layer 9 has a magnetization direction fixed by the exchange coupling with the anti-ferromagnetic layer 8. The pin layer 9 is made from a ferromagnetic material such as CoFe.

Moreover, the first magnetic metal film 2 may be a so-called layer ferrimagnet formed on the undercoat layer 7. The layer ferrimagnet is disclosed in Japanese Patent Publication 7-169026 as two ferromagnetic layers sandwiching an anti-ferromagnetic coupling film.

As the anti-ferromagnetic coupling film, a film formed from ruthenium. In this case, by defining the film thickness formed by ruthenium to be 0.3 nm to 1.0 nm, the two ferromagnetic layers have opposite magnetization directions. This prevents leak of magnetism from the first metal magnetic film.

The tunnel barrier layer 3 is a very thin layer formed by a non-magnetic and insulating metal such as $Al_2O_3$. However, the material is not limited to this if a tunnel current flows. The tunnel barrier layer 3 is formed on the pin layer 9. When a sense current is made to flow vertically to the film surface, a tunnel current flows in this tunnel barrier layer 3.

The second magnetic metal layer 4 is a magnetization free layer and its magnetization direction changes freely. The second magnetic metal layer 4 includes a ferromagnetic layer 10 and a free layer 11 which are successively formed from the side of the tunnel barrier layer. The ferromagnetic layer 10 increases the spin polarizability in the free layer 11. The ferromagnetic layer 10 is formed, for example, from CoFe. The free layer 11 can freely change its magnetization direction. The free layer 11 is formed from a soft magnetic material such as NiFe.

The non-magnetic metal layer 5 plays a role to weaken control of the magnetization direction of the free layer 11 by the conductive anti-ferromagnetic layer 6 which will be detailed later. When this non-magnetic metal layer 5 is absent, the exchange coupling between the conductive anti-ferromagnetic layer 6 and the free layer 11 becomes stronger, which controls the magnetization direction too much and accordingly, the magnetization direction of the free layer 11 is firmly fixed. The non-magnetic metal layer 5 is formed, for example, from Cu.

When the non-magnetic metal layer is formed from Cu, the thickness is preferably 0.5 nm to 2 nm.

When the layer formed from Cu has a thickness smaller than 0.5 nm, the exchange coupling between the conductive anti-ferromagnetic layer 6 and the free layer 11 becomes too strong and the magnetization control also becomes too strong. This fixes the magnetization direction of the free layer 11 and the reproduction operation becomes impossible. When the layer formed from Cu has a thickness greater than 2 nm, it becomes impossible to control the magnetization direction of the free layer by the conductive anti-ferromagnetic layer 6 and a domain wall is generated in the free layer 11, which disables to suppress the Barkhausen noise.

The conductive anti-ferromagnetic layer 6 controls the magnetization direction of the free layer 11. This control of the magnetization direction by the conductive anti-ferromagnetic layer 6 enables to prevent generation of a domain wall in the free layer 11. Moreover, since the aforementioned non-magnetic metal layer 5 is present, the control of the magnetization direction is weakened. Accordingly, the magnetization direction of the free layer 11 is not fixed to a particular direction. The conductive anti-ferromagnetic layer 6 is formed, for example, from IrMn.

The magnetic tunnel junction element 1 utilizes a conductance change of the tunnel current flowing in the tunnel barrier layer 3, depending on the relative angle of the magnetization directions of the aforementioned pin layer 9 and the free layer 11.

More specifically, in the pin layer 9, the magnetization direction is fixed while in the free layer 11, the magnetization direction can be freely changed although there is only a single magnetic domain because of the magnetization direction control by the conductive anti-ferromagnetic layer 6. In the tunnel element 1, the sense current is made to flow in a direction vertical to the respective layers.

Because the magnetization direction of the free layer 11 is different from the magnetization of the pin layer 9, the conductance of the tunnel current flowing in the tunnel barrier layer 3 is changed. That is, the magnetization direction of the free layer 11 is changed according to a change of an external magnetic field, which in turn changes magnetization direction of the free layer 11 with respect to the magnetization direction of the pin layer 9, and this changes the conductance of the tunnel current. When the TMR element 1 is employed, for example, for an MR head, the aforementioned conductance change of the tunnel current is detected for reproducing an information recorded on a recording medium such as a magnetic recording medium.

As is clear from the above explanation, the TMR element 1 according to the present invention controls the magnetization direction of the free layer 11 so as to obtain a single domain. Accordingly, it becomes possible to prevent generation of a domain wall in the free layer 11 and to prevent generation of hysteresis, enabling to suppress the Barkhausen noise.

Next, explanation will be given on a production method of the aforementioned TMR element 1 with reference to FIG. 2 to FIG. 9. Here, the production method of the TMR element 1 will be explained when the TMR element is employed in an MR head 20 as one of the magnetic devices. However, the present invention is not to be limited to this case.

Figure 2:
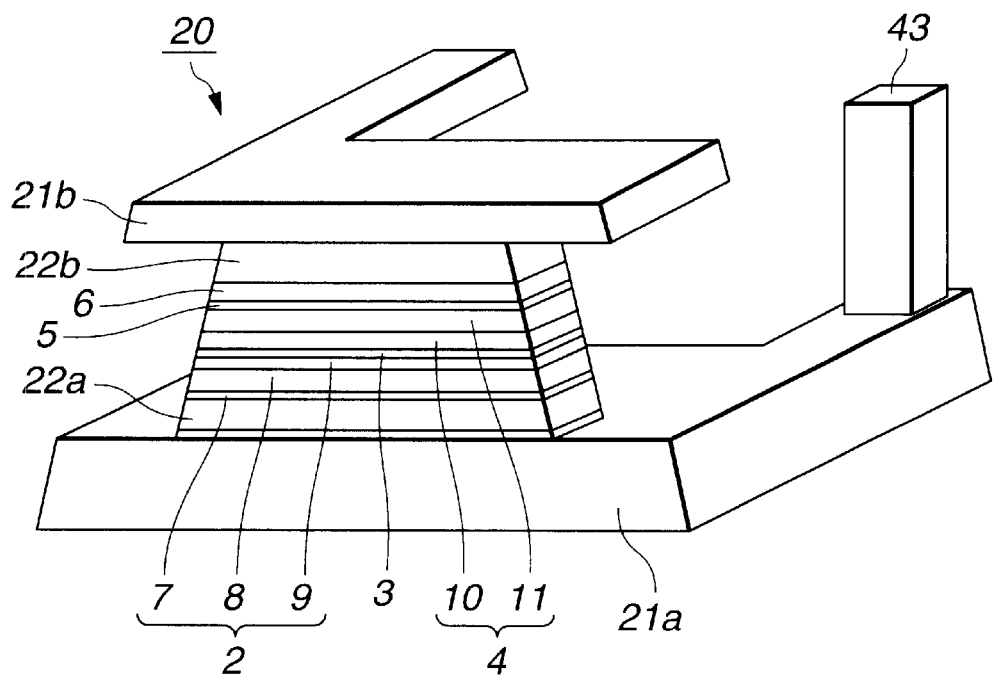
FIG. 2 is a perspective view of an MR head produced by utilizing the aforementioned MR element.

Here, an explanation will be given on the configuration of the MR head. As shown in FIG. 2, the MR head 20 includes shields 21a and 21b, gaps 22a and 22b, and the TMR element 1.

As has been described above, the TMR element 1 includes a first magnetic metal layer 2, a tunnel wall layer 3, a second magnetic metal layer 4, a non-magnetic metal layer 5, and a conductive anti-ferromagnetic layer 6. Moreover, the first magnetic metal layer includes an undercoat layer 7, an anti-ferromagnetic layer 8, and a pin layer 9. The second magnetic metal layer 4 includes a ferromagnetic layer 10 and a free layer 11.

The shields 21a and 21b also serve as electrodes with respect to the gaps 22a and 22b which will be detailed later. The shields 21a and 21b are formed from a conductive magnetic material such as Sendust (Fe—Al—Si alloy). Moreover, the distance between the shields 21a and 21b will be referred to as an inter-shield distance.

The gaps 22a and 22b magnetically isolate the shields 21a, 21b, and the magnetic metal layers. More specifically, the gap 22a isolates the shield 21a from the first magnetic metal layer 2 while the gap 22b isolates the shield 21b from the second magnetic metal layer 4. The gaps 22a, 22b also serve as electrodes for the shields 21a, 21b. The gaps 22a and 22b are formed from a conductive non-magnetic material such as Cu.

In the MR head 20 having the aforementioned configuration, the magnetization direction of the first magnetic metal layer 2 is fixed approximately in parallel to a signal magnetic field applied from the magnetic recording medium. Moreover, the magnetization direction of the second magnetic metal layer 4 is approximately vertical to the signal magnetic field applied from the magnetic recording medium. When a predetermined signal magnetic field is applied to this magnetic head, the magnetization direction of the second magnetic metal layer 4 is changed.

At this moment, in the MR head 20, a constant current flows from the second magnetic metal layer 4 to the first magnetic metal layer 2. Consequently, a tunnel current flows between the second magnetic metal layer 4 and the first magnetic metal layer 2. In this magnetic head, a change of the relative angle defined by the magnetization of the second magnetic metal layer 4 and the magnetization of the first magnetic metal layer 2 causes the conductance of the tunnel current to change.

The aforementioned conductance of the tunnel current can be detected by measuring a voltage between the second magnetic metal layer 4 and the first magnetic metal layer 2. In this MR head 20, a conductance change of this tunnel current is detected so as to reproduce an information recorded on the magnetic recording medium.

Description will now be directed to a production method of the MR head 20 having the aforementioned configuration.

Figure 3:
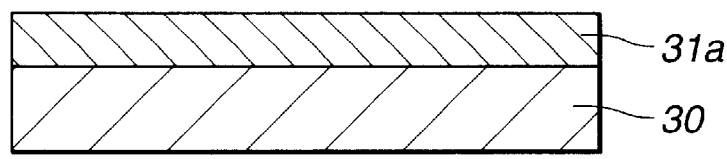
FIG. 3 explains the production method of the MR element with a cross sectional view at the stage up to a magnetic film has been formed.

Firstly, as shown in FIG. 3, a magnetic film 31a is formed on a main surface of a substrate 30, which film becomes a lower shield 21a at the final stage. The magnetic film 31a is preferably flattened with a high degree. The substrate 30 may be formed from AlTiC, TiO—CaO, and other materials which are usually used for producing a thin film head.

Figure 4:
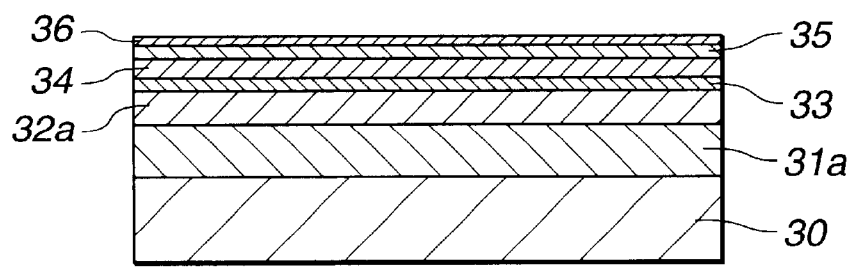
FIG. 4 explains the production method of the MR element with a cross sectional view at the stage up to a second non-magnetic film has been formed.

Next, as shown in FIG. 4, the magnetic film 31a is covered with a first non-magnetic film 32a, a soft magnetic film 33, an anti-ferromagnetic film 34, a ferromagnetic film 35, and a second non-magnetic film 36 which are successively formed using a thin film formation technique such as sputtering. At the final stage, the first non-magnetic film 32a becomes the gap 22a. The soft magnetic film 33 becomes the undercoat layer 7. The anti-ferromagnetic film 34 becomes the anti-ferromagnetic layer 8. The ferromagnetic film 35 becomes the pin layer 9. The second non-magnetic film 36 becomes the tunnel barrier layer 3.

It should be noted that in case $Al_2O_3$ is used as the non-magnetic film 36, the $Al_2O_3$ may be layered directly or Al may be layered and then oxidized by oxygen plasma. When Al is oxidized by oxygen plasma, the oxidization degree may be controlled by adjusting the oxidation time, gas pressure, oxygen partial pressure, high-frequency wave making power, and the like.

Figure 5:
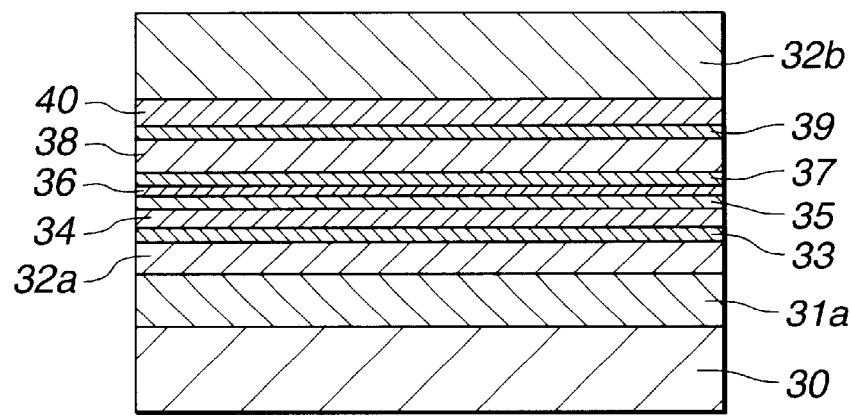
FIG. 5 explains the production method of the MR element with a cross sectional view at the stage up to a first non-magnetic film has been formed.

Next, as shown in FIG. 5, the second non-magnetic film 36 is covered with a second ferromagnetic film 37, a second soft magnetic film 38, a third non-magnetic film 39, a second anti-ferromagnetic film 40, and a first non-magnetic film 32b which are successively formed using a thin film formation technique such as sputtering. At the final stage, the second ferromagnetic film 37 becomes the ferromagnetic layer 10, the second soft magnetic film 38 becomes the free layer 11, the third non-magnetic film 39 becomes the non-magnetic metal layer 5, the second anti-ferromagnetic film 40 becomes the conductive anti-ferromagnetic layer 6, and the first non-magnetic layer 32b becomes the gap 22b.

Figure 6:
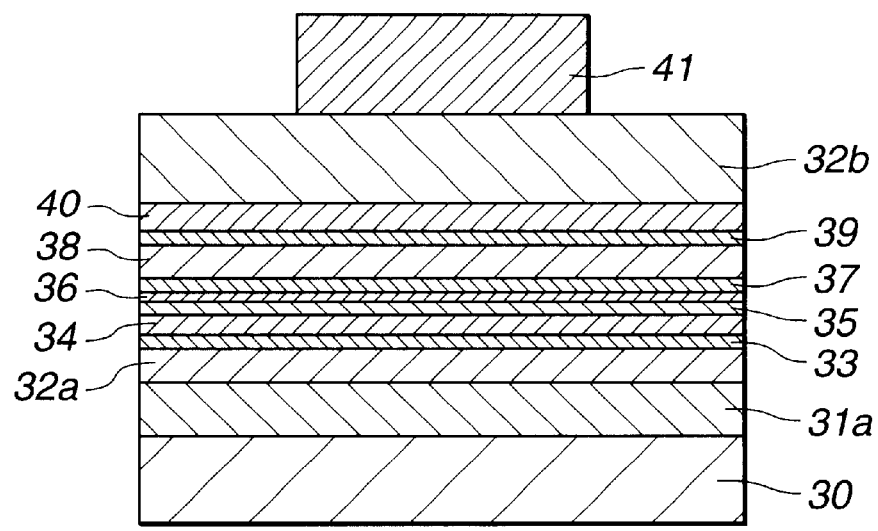
FIG. 6 explains the production method of the MR element with a cross sectional view at the stage when a resist pattern 41 has been formed on the first non-magnetic film.

Next, a resist material is applied to the first non-magnetic layer 32b so as to form a resist film, which is patterned into a predetermined shape using the photolithography method so as to form a resist pattern 41 as shown in FIG. 6. More specifically, the resist film is patterned to a size corresponding to the MR tunnel element 1 to be left at the final stage.

Figure 7:
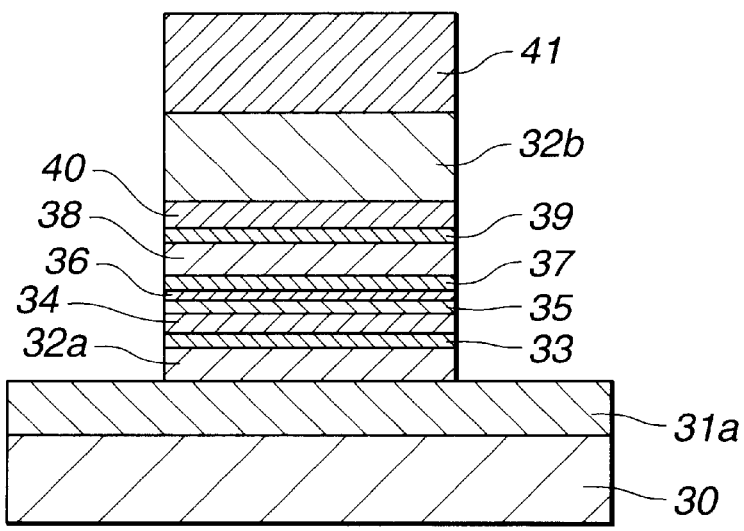
FIG. 7 explains the production method of the MR element with a cross sectional view at the stage when etching has been performed to the first non-magnetic layer up to the first non-magnetic film.

Next, as shown in FIG. 7, by way of ion milling, etching is performed until the magnetic film 31a is exposed and the respective layers have predetermined width values. This etching determines a track width. Moreover, the depth of the TMR element 1 from the sliding surface is defined as the depth.

Figure 8:
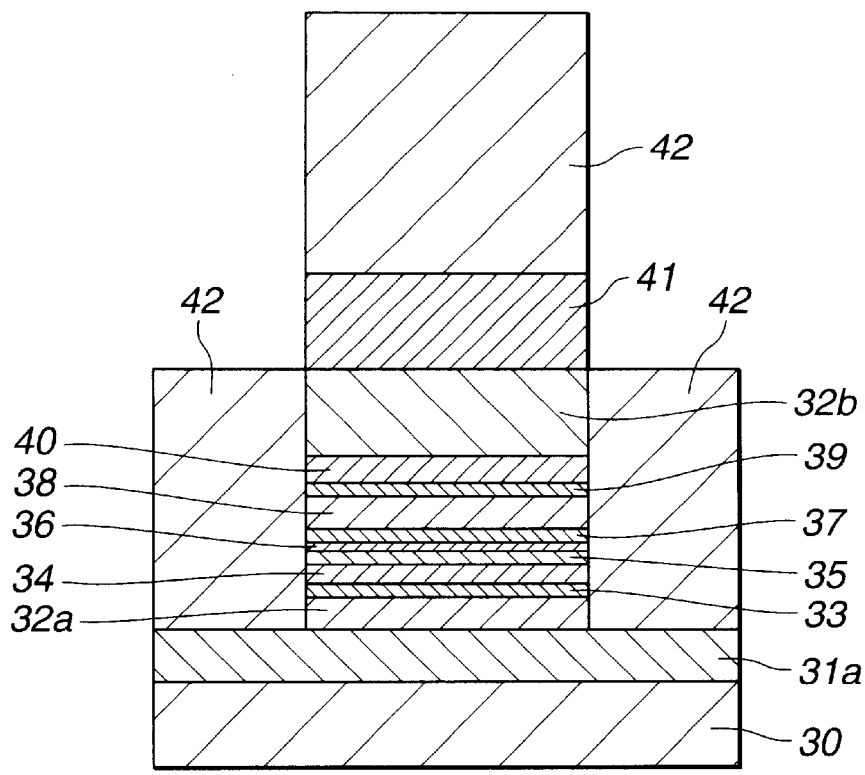
FIG. 8 explains the production method of the MR element with a cross sectional view at the stage when an insulation film has been formed.

Next, as shown in FIG. 8, an insulation film 42 is formed on the magnetic film 32a which has been exposed by etching. Here, the insulation film 42 is also formed on the resist pattern 41.

Figure 9:
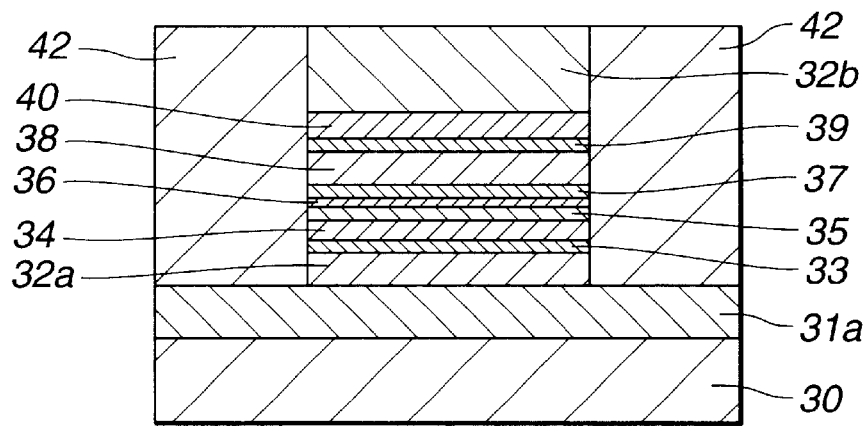
FIG. 9 explains the production method of the MR element with a cross sectional view at the stage after the resist has been removed.

Next, as shown in FIG. 9, the resist pattern 41 is peeled off using an organic solvent or the like. Here, the insulation film 42 formed on the resist pattern 41 is simultaneously removed.

Next, on the insulation film 42 and the first non-magnetic film 32b forming approximately a single plane, a magnetic film 31b is formed to be the shield 21b at the final stage. After this, the magnetic film 31b is formed into a predetermined shape to be the shield 21b. The magnetic film 31b may be formed by a plating method using a predetermined resist pattern, a sputtering method for film formation followed by etching, or the like.

Next, the magnetic film 31a is subjected to photolithography and etching so as to be formed into a predetermined shape serving as the shield 21a.

Next, an opening 43 is formed in the insulation film 42. The shield 21a is made to expose through this opening 43, which is filled with a conductive material so as to connect the shield 21a electrically, thus producing the MR head 20 shown in FIG. 2. It should be noted that although not shown in FIG. 2, the insulation film 42 is placed between the shield 21a and the shield 21b and around them.

As is clear from the above-given explanation, in the production method of the TMR element 1 according to the present invention, it is possible to continuously perform the film formation processes and the oxidization of the second non-magnetic film 36. Accordingly, the production can be performed within an inline type sputter apparatus, i.e., it is possible to produce the TMR element 1 without exposing a product to the atmosphere. This prevents deterioration of the quality. Moreover, it is possible to simplify the production procedure of the TMR element 1.

EXAMPLES

Next, explanation will be given on the relationship between the thickness of the non-magnetic metal layer 5 when the aforementioned TMR element 1 is applied to the MR head 20, the reproduction sensitivity, and generation of the Barkhausen noise according to specific examples.

Example 1

In Example 1, an MR head having a configuration identical to the MR head 20 shown in FIG. 2 has been produced. Materials used for the respective layers are as follows.

Tunnel element 3: $Al_2O_3$
Non-magnetic metal layer 5: Cu
Conductive anti-ferromagnetic layer 6: $Ir_{20}Mn_{80}$
Undercoat layer 7: $Ni_{80}Fe_{20}$
Anti-ferromagnetic layer 8: $Ir_{20}Mn_{80}$
Pin layer 9: $Co_{90}Fe_{10}$
Ferromagnetic layer 10: $Co_{90}Fe_{10}$
Free layer 11: $Ni_{80}Fe_{20}$
Shield 21a, 21b: Sendust (Fe—Si—Al alloy)
Gap 22a, 22b: Cu Here, the thickness of the non-magnetic metal layer 5 was 0.5 nm. Moreover, the track width was 1 μm, the depth was 1 μm, and the inter-shield distance was 0.2 μm.

Example 2

In Example 2, an MR head was produced in the same way as in Example 1 except for that the thickness of the non-magnetic metal layer 5 was 1 nm.

Example 3

In Example 3, an MR head was produced in the same way as in Example 1 except for that the thickness of the non-magnetic metal layer 5 was 2 nm.

Example 4

In Example 4, an MR head was produced in the same way as in Example 1 except for that the thickness of the non-magnetic metal layer 5 was 3 nm.

Comparative Example 1

In Comparative Example 1, an MR head was produced without forming the non-magnetic metal layer 5. It should be noted that this MR head was produced in the same way as the aforementioned Example 1 except for that the non-magnetic metal layer 5 was not formed.

For the MR heads produced in the Examples 1 to 4 and in the Comparative Example 1, the reproduction sensitivity and generation of the Barkhausen noise were checked. The results are shown in Table 1.

Here, the reproduction sensitivity is evaluated as Δ when it was possible to reproduce a magnetic signal recorded on a magnetic recording medium, as ○ when the reproduction of a magnetic signal was especially preferable, and as X when it was difficult to reproduce a magnetic signal. As for the Barkhausen noise, the MR heads were evaluated as Δ when little Barkhausen noise was generated, as ○ when almost no Barkhausen noise was generated, and as X when the Barkhausen noise was remarkable.

TABLE 1

| | Cu film thickness (nm) | Reproduction sensitivity | Barkhausen noise |
|---|---|---|---|
| Example 1 | 0.5 | Δ | ○ |
| Example 2 | 1 | ○ | ○ |
| Example 3 | 2 | ○ | Δ |
| Example 4 | 3 | ○ | X |
| Comparative Example 1 | 0 | X | ○ |

Table 1 shows that when the thickness of the non-magnetic metal layer 5 is below 0.5 nm, it is difficult to reproduce a magnetic signal. Moreover, as in the MR head of Example 4, when the thickness of the non-magnetic metal layer is equal to or above 2 nm, it is impossible to sufficiently suppress the Barkhausen noise. Accordingly, the thickness of the non-magnetic metal layer 5 is preferably 0.5 nm to 2 nm.

As is clear from the above explanation, the MR element according to the present invention controls magnetization in the magnetization free layer and enables to obtain a single magnetic domain. This enables to prevent generation of a domain wall in the magnetization free layer, prevent generation of hysteresis, and suppress generation of the Barkhausen noise. Thus, by utilizing the ferromagnetic tunnel effect, it is possible to realize an MR element performing a stable reproduction.

Moreover, in the production method of the MR element according to the present invention, it is possible to continuously perform the production steps. This enables to simplify the production procedure of the MR element. Moreover, it is possible to provide an MR element utilizing the ferromagnetic tunnel effect and performing a stable reproduction.

What is claimed is:

1. A magneto-resistive element, comprising:
   a magnetization fixed layer whose magnetization is fixed in a predetermined direction;
   a tunnel barrier layer formed on the magnetization fixed layer;
   a magnetization free layer formed on the tunnel barrier layer and whose magnetization direction freely changes;
   a non-magnetic metal layer formed on the magnetization free layer, the non-magnetic metal layer being formed from Cu and having a thickness of 0.5 nm to 1.5 nm; and
   a conductive anti-ferromagnetic layer in direct contact with the non-magnetic metal layer.

2. A magneto-resistive element as claimed in claim 1, wherein the magnetization fixed layer includes an anti-ferromagnetic film, a ferromagnetic film formed on the anti-ferromagnetic film, an anti-ferromagnetic coupling film formed on the ferromagnetic film, and a ferromagnetic film formed on the anti-ferromagnetic coupling film.

3. A magneto-resistive element, comprising:

a first magnetic metal layer having a fixed magnetization direction;

a tunnel barrier layer formed on the first magnetic layer;

a second magnetic metal layer having a free magnetization direction, the second magnetic metal layer being formed on the tunnel barrier layer;

a non magnetic metal layer formed on the second magnetic metal layer, the non magnetic metal layer having a thickness of 0.5 nm to 1.5 nm; and a conductive anti-ferromagnetic layer being in direct contact with the non-magnetic metal layer wherein the conductive anti-ferromagnetic layer is coupled to the second magnetic metal layer via the non magnetic metal layer to control the free magnetization direction of the second magnetic layer to obtain a single magnetic domain in the second magnetic layer.

4. A magneto-resistive element of claim 3, wherein the first magnetic metal layer includes a magnetization fixed layer.

5. A magneto-resistive element of claim 3, wherein the first magnetic metal layer includes an undercoat layer.

6. A magneto-resistive element of claim 3, wherein the first magnetic metal layer includes an anti-ferromagnetic layer.

7. A magneto-resistive element of claim 3, wherein the first magnetic metal layer includes a pin layer.

8. A magneto-resistive element of claim 3, wherein the non-magnetic metal layer is formed from Cu.

9. A magneto-resistive element of claim 3, wherein the second magnetic metal layer includes a magnetization free layer.

10. A magneto-resistive element of claim 3, wherein the second magnetic metal layer includes a ferromagnetic layer.

11. A magneto-resistive element of claim 3, wherein the second magnetic metal layer includes a free layer.

12. A magneto-resistive element, comprising:

a first magnetic metal layer having a fixed magnetization direction;

a tunnel barrier layer formed on the first magnetic layer;

a second magnetic metal layer having a free magnetization direction, the second magnetic metal layer being formed on the tunnel barrier layer;

a non magnetic metal layer formed on the second magnetic metal layer wherein the non-magnetic metal layer has a thickness of 0.5 nm to 1.5 nm; and a conductive anti-ferromagnetic layer formed directly on the non-magnetic metal layer wherein the conductive anti-ferromagnetic layer is coupled to the second magnetic metal layer via the non magnetic metal layer to control a magnetic domain without fixing the magnetization direction of the free magnetization direction.

13. A magneto-resistive element of claim 12, wherein the conductive anti-ferromagnetic layer is coupled to the second magnetic metal layer via the non magnetic metal layer.

14. A magneto-resistive element of claim 12, wherein the conductive anti-ferromagnetic layer is coupled to the second magnetic metal layer to control the magnetic domain without fixing the magnetization direction of the second magnetic metal layer.

* * * * *